March 11, 1969    H. C. FISCHER ET AL    3,431,687
REINFORCED ARTICLE
Original Filed Aug. 10, 1964

United States Patent Office 3,431,687
Patented Mar. 11, 1969

3,431,687
REINFORCED ARTICLE
Herbert C. Fischer and Herbert C. Fischer, Jr., both of 3 Sawyer Road, Wellesley, Mass. 02181
Original application Aug. 10, 1964, Ser. No. 388,416, now Patent No. 3,208,838, dated Sept. 28, 1965. Divided and this application June 16, 1965, Ser. No. 464,309
U.S. Cl. 51—206    17 Claims
Int. Cl. B24d 5/00, 7/00; B32b 31/00

ABSTRACT OF THE DISCLOSURE

A stressed reinforced article disclosed in the specific form of a grinding wheel having a central axis of rotation, the wheel being formed of abrasive grains bonded together with a plastic material and having integrally bonded reinforcing means imbedded in the wheel. The reinforcing means comprises strands each composed of a multiplicity of glass-like fibers impregnated with an adherent coating compatible with and having a high coefficient of contraction relatively to that of the plastic material of the wheel. It is shown in the form of a tape generally annularly positioned in a curved path around the axis of the wheel, either entirely within the wheel or imbedded in the wheel surface, maintaining the wheel portion within the tape in compressed condition, or, alternatively, the form of an open mesh fabric imbedded in the wheel positioned generally perpendicularly with respect to the wheel axis, providing a grinding wheel reinforced with a substantial proportion of stressed glass-like fibers.

---

This invention relates to reinforced plastic articles and is a division of my application Ser. No. 388,416, filed Aug. 10, 1964, now U.S. Patent No. 3,208,838 issued Sept. 28, 1965. More especially, it relates to the incorporation of stressed reinforcing elements in plastic articles, such as grinding wheels, for example, to increase their strength so that they may be rotated at higher speeds for increased grinding efficiency.

In the grinding wheel art, it is known that grinding efficiencies increase generally in proportion to the speed of the wheel surface, so that it is important to rotate a grinding wheel at a high speed for maximum grinding efficiency. However, the maximum wheel speed is limited by wheel strength, since centrifugal forces which the wheel must resist without breaking up increase rapidly with increasing wheel speed.

Although attempts have been made to reinforce grinding wheels by the incorporation therein of fabric reinforcing structures, as, for instance, are shown and described in Patent No. 3,141,271, such reinforcing structures do not permit significant, if any, increase in grinding wheel speeds. Rather, their function is to the highly desirable safety feature of holding the pieces of the grinding wheel together after partial failures and cracks have occurred in the wheel, so that the wheel will not break up and throw pieces with the resulting possibility of serious personal injury.

It is a major object of the present invention to so reinforce, by stressing an element thereof, articles such as grinding wheels to increase their strength to the extent that significant wheel speed increase may be achieved without otherwise decreasing safety considerations, or for other reasons.

It is another object of the invention to provide articles with curved stressed elements, preferably curved around a central axis.

It is still another object of the invention to provide articles with stressed elements imbedded and concealed therewithin.

It is yet another object of the invention to provide a stiffened preformed stressing element having a potentially high coefficient of dimensional change, for incorporation in an article for subsequent stressing thereof.

According to the present invention, it has been discovered that the strength of articles, such as grinding wheels, composed at least in part of plastic material, may be increased to a surprising extent by incorporating therein integral reinforcing means having fibers permanently maintained in stressed condition.

This is accomplished according to broad aspects of the methods of the invention by reinforcing an article composed at least in part of potentially relatively non-yielding plastic material with a preferably preformed fiber reinforcing element having a potentially high coefficient of dimensional change relatively to that of said body, and, after setting said plastic material to a relatively non-yielding condition, dimensionally changing said reinforcing element, whether curved or straight, while it is maintained in intimate contact with said body to stress the fibers of the reinforcing element with its terminating ends being imbedded and concealed within the body, if desired. With a structure such as a grinding wheel, the use of highly thermally and dimensionally stable glass-like fibers of either glass or ceramic is desirable as a reinforcing element in order to avoid affecting grinding performance should the reinforcing element become exposed at a grinding surface through wheel wear, and for other reasons as well. With such a reinforcing element, the methods of the invention may be utilized by pretreating the glass fibers, preferably in the form of a suitable assembly thereof as in a fabric, for example, a stiffened preformed element with a partially cured bonding agent as described in our earlier U.S. Patent No. 3,141,271, but, in addition having a latent high coefficient of contraction, either incorporating the treated reinforcing element into the plastic body while said body is in plastic condition and setting said plastic material to a relatively non-yielding condition with said reinforcing element incorporated therein and without dimensionally changing the bonding agent or, alternatively, where external reinforcement is acceptable surrounding the body with the reinforcing element in intimate contact therewith after setting the organic plastic material and in either case thereafter contracting said bonding agent and reinforcing element to stress the fibers of said element within said body. With woven glass fiber tape, and a bonding agent having a high coefficient of contraction relatively to that of the plastic bonding material of the grinding wheel, unexpectedly high increases in safe wheel speed of the order of up to 50 percent have been achieved.

For the purpose of more fully explaining further objects and features of the invention, reference is now made to the following detailed description of preferred embodiments thereof, together with the accompanying drawings, wherein.

Figure 1:
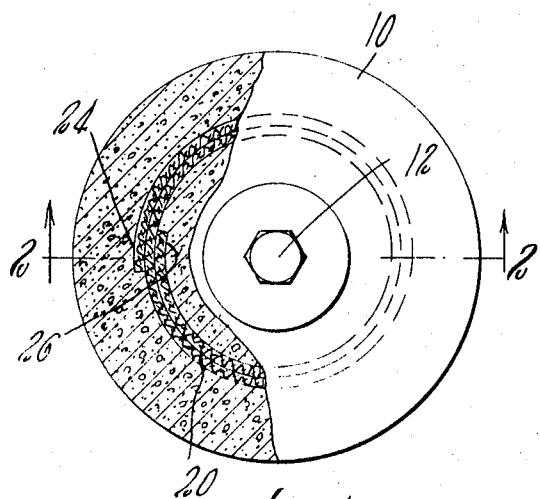
FIG. 1 is a plan view of a grinding wheel of the disk type, partly broken away and in section, constructed according to the present invention.
Figure 2:
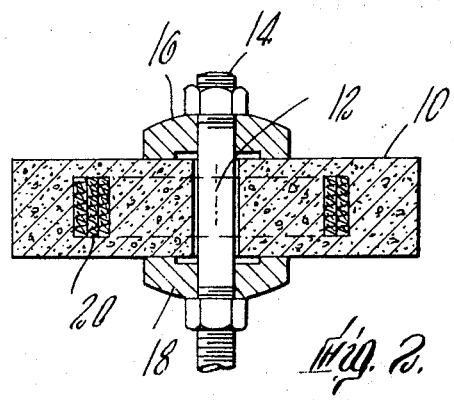
FIG. 2 is a side sectional view of the wheel of FIG. 1.

In FIGS. 1 and 2 is shown an abrasive grinding wheel 10 of the disk type rotatable about its central axis 12 by means of a shaft 14, said shaft having suitable clamping elements 16, 18 contacting each side of the wheel. In accordance with the present invention, such wheel has incorporated therein a curved stressed fiber reinforcing element 20 in the form of a closed annular figure of revolution of glass-like fiber fabric tape of substantially greater width than thickness positioned around the central axis of rotation of the wheel with the widthwise dimension of the tape of the element preferably parallel to the axis 12. As shown in said drawings, the element comprises two turns of tape with the free ends 24, 26 overlapped, so that the entire element including its terminations is concealed within wheel 10, providing a continuous annular cylindrical ring of stressed fibers compressing the wheel therewithin.

Figure 3:
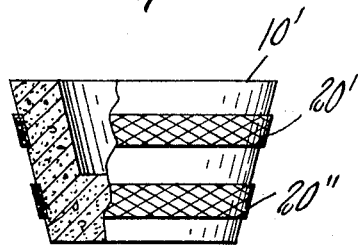
FIG. 3 is a side sectional view of a grinding wheel of the cup type, partly away and in section, constructed according to the present invention.

In FIG. 3 is shown an abrasive grinding wheel 10' of the cup type having two closed curved reinforcing elements 20', 20" in the form of a frusto-conical figure of revolution spaced axially thereabout in intimate contact with the body of the wheel and partially embedded therein, the fibers of such elements being stressed to compress the body of the wheel therewithin as with the structure of FIGS. 1 and 2.

Figure 4:
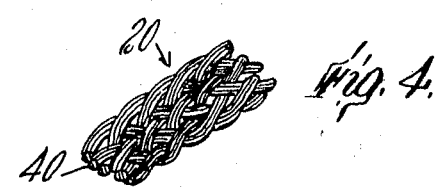
FIG. 4 is an isometric view of a portion of the reinforcing element as utilized in the wheels of FIGS. 1 through 3.
Figure 7:
FIG. 7 is a side sectional view of the wheel of FIG. 6.

As best shown in FIGS. 4 and 7, the tape itself preferably consists of a braided structure, although knitted or woven might as well be used, with relatively bulky strands 40 of roving, each strand being composed of a multiplicity of glass-like monofilaments 42, such as glass, ceramic, or the like, the roving being generally untwisted with each of the monofilaments being substantially continuous and with the strands having a coating 44. The strands are preferably disposed in over and under intercrossing relationship providing a multiplicity of interlaced strand crossing in a predetermined pattern with a surface pattern of strand projections as shown.

Figure 5:
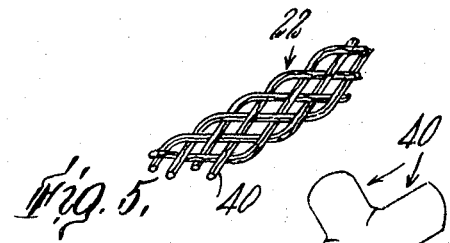
FIG. 5 is an isometric view of a modification of the reinforcing element of FIG. 4.

The tape may be either a relatively closed mesh as shown in FIG. 4 or an open mesh tape as shown in FIG. 5, the former providing a somewhat greater bulk of fibers and the latter somewhat better bonding to the substance of the wheel itself because of a bond grain-to-grain through the mesh interstices. However, with either a closed mesh tape or an open mesh tape, the rough surface composed of the strand projections and depressions provides highly effective bonding of the tape to the substance of the wheel, both the abrasive grains and the bonding agent thereof. The tape utilized for best results should have a relatively high ratio of width to thickness, at least about 1 to 3 and preferably about 1 to 5 as shown.

As a particularly important aspect of the invention, hereinafter described in detail with reference to the detailed description of the methods of the invention, the glass-like strands are pretreated with a bonding agent which is subsequently cured and changed dimensionally to provide a coating 44 on and in the glass fibers to stress them within the body of the wheel 10.

Figure 8:
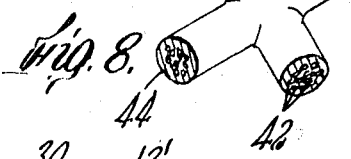
FIG. 8 is a view of a pretreated fiber strand such as is preferably used in the reinforcing element of FIGS. 1 through 7.
Figure 6:
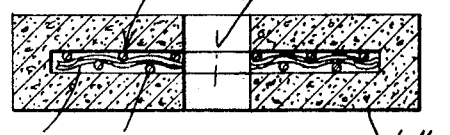
FIG. 6 is a plan view of a grinding wheel, modified from that of FIGS. 1 through 3, partly broken away and in section, constructed according to the invention.

In FIGS. 6 and 7 is shown an abrasive wheel 10" of the disk type generally similar to that of FIGS. 1 and 2 but having incorporated therein a reinforcing element 30 of glass-like fiber open mesh arranged in the plane of the wheel 10" perpendicular to the central axis of rotation of the wheel. As shown in said drawings, the element comprises an open mesh woven fabric, having warp strands 32 and filling strands 34 surrounding the central axis of rotation of the wheel in a plane generally centrally spaced from the side surfaces of the wheel, so that the entire element is embedded and concealed therewithin. As with the structure of FIGS. 1 through 3, the strands are shown in FIG. 8, being composed of a multiplicity of glass-like fibers 42 with a coating 44 therein and thereon.

In the operation of a grinding wheel such as is shown particularly in FIGS. 6 and 7, when the glass-like fibers of the reinforcing element become exposed at the abrading surface, the abrasive cutting ability of the wheel is nevertheless substantially unimpaired since the glass-like filaments are easily abrasively removed by being ground into fine particles. The bonding agent originally coating and uniting the glass-like monofilaments is also easily abraded away. Thus the wheel may be safely operated during the time when the reinforcing element is exposed at the surface, whether the side or peripheral surface of the wheel, and this is due as well to the continuity of adhesion between the components of the wheel and the reinforcing elements, there being no separation or loosening of the reinforcing element from the wheel, the whole in effect, being an integral structure.

In the manufacture of the grinding wheels of FIGS. 1, 2, 3, 6 and 7, the body of the grinding wheel is conventionally composed of abrasive grains such as silicon carbide and an unreacted potentially non-thermoyielding organic plastic material such as a two-step phenol-formaldehyde resin, a typical example of which is a Union Carbide resin No. 5417 which has a melting point of 70–80° C.

According to the present invention the preformed, stiffened glass-like fiber reinforcing element, either in the form of the tape element 20 or 22 of FIGS. 1, 2 and 3; or the disk element 30 of FIGS. 6 and 7, pretreated with a suitable bonding agent preferably at least partially cured but having a remaining latent potentially high coefficient of contraction, is either incorporated in the wheel while the organic plastic material thereof is still in plastic condition, as in the manufacture of the wheels of FIGS. 1, 2, 6 and 7, or subsequently as with the externally reinforced cup wheel of FIG. 3. Before the reinforcing element is contracted, the organic plastic material is set to a relatively non-yielding condition, usually, if a phenol-formaldehyde resin, by heat and pressure in the presence of a catalyst such as hexamethylenetetramine for a period of many hours. During such time, at least until the phenol-formaldehyde resin becomes substantially non-yielding, the bonding agent of the reinforcing element must retain a substantial proportion of its potential coefficient of contraction so that it can thereafter undergo dimensional contraction to stress the glass-like fibers within the substantially non-yielding body of the grinding wheel. With the subsequently reinforced wheel of FIG. 3, however, this is not a problem since the treated reinforcing tape can be applied after setting of the phenol-formaldehyde resin. Although this procedure may not produce the optimum strength of the wheel, it is nevertheless satisfactory.

In either procedure, the stressing of the fibers of the reinforcing element by dimensional changes which occurs as a subsequent step (although possibly overlapping to a degree) to the setting of the organic plastic of the body of the article to be stressed is vital to the success of the methods of the invention. With glass-like fiber reinforcement of a phenol-formaldehyde bonded grinding wheel such as is described above and shown in FIGS. 1, 2, 3, 6 and 7, an organic plastic bonding agent having a suitably high coefficient of contraction of at least the order of 1 to 10 percent has been found to include certain melamine-formaldehyde resins, such as Cymel Resin 481 and 406 manufactured by American Cyanamid Company, with a molecular contraction of about 5–10% occurring at over 100° C. These have been found to be effective when applied to glass-like fibers preferably having a silane finish or the like. Other resins such as nylon and certain polyester resins with high coefficient of dimensional change relatively to that of the body of the article, and with suitable compatibility for bonding with the plastic material thereof and with the glass-like or other fibers will serve as well. With phenol-formaldehyde resin as a body material with hexamethylenetetramine as a catalyst, the use of melamine-formaldehyde as a bonding agent for the glass-like reinforcing element is particularly effective since, in addition to catalyzing the reaction of the phenol-formaldehyde resin to a non-thermoyielding condition, it retards the polymerization of the melamine-formaldehyde until the hexamethylenetetramine is eliminated by continued high temperature. The melamine-formaldehyde resin then contracts, the temperature at which such occurs being higher than the melting temperature and curing temperature of the phenol-formaldehyde resin. Thus, in accordance with the most important principle of the methods of the present invention, the contraction of the melamine-formaldehyde resin is delayed sufficiently for the phenol-formaldehyde to become non-yielding for optimum stressing of the glass-like fibers to provide the novel grinding wheels of the invention.

Although the methods of the invention as set forth above are specifically described with reference to grinding wheel construction utilizing relatively inextensible and incontractible glass-like fibers, it will be apparent that other types of fibers, either organic or inorganic, natural or synthetic, may be utilized as well with or without a bonding agent therefor capable of subsequent dimensional change to stress the fibers within a non-yielding body. In the latter case fibers of resins such as nylon and polyester as mentioned above which themselves have a potential high coefficient of dimensional change relatively to the plastic body material may be utilized to stress the fibers within the body after the latter is set. Thus, the invention is capable of providing a wide variety of stressed fiber reinforced articles in particular cylindrical articles such as tubes and pipes having an annular ring of stressed fibers which operate to maintain a portion of the body of the article in compressed condition and so greatly increase its bursting strength or strength to resist internal pressures.

Various other modifications of the invention, within the spirit thereof and the scope of the appended claims, will occur to those skilled in the art.

What is claimed is:

1. A grinding wheel having a central axis of rotation, said wheel being formed of abrasive grains bonded together with an organic plastic material and having integrally bonded curved reinforcing means in the form of a closed figure of revolution extending along the central axis of said wheel and imbedded in said wheel, said reinforcing means comprising strand means composed of a multiplicity of glass fibers impregnated with an adherent coating compatible with the organic plastic material of said wheel and having a high coefficient of contraction of at least 1 to 10 percent relatively to that of said organic plastic materials, and being positioned generally annularly around the central axis of rotation of the wheel maintaining said wheel in compressed condition, the glass fibers of said curved reinforcing means being permanently maintained in stressed condition within said wheel, providing a grinding wheel reinforced with a substantial proportion of stressed glass fibers.

2. A grinding wheel as claimed in claim 1 wherein said curved reinforcing means surrounds the annular surface of said wheel.

3. A reinforced article composed at least in part of a relatively non-yielding body having integrally bonded curved reinforcing means at least partially imbedded in said article, said reinforcing means comprising fiber element means consisting of a multiplicity of fibers coated with a bonding agent having a high coefficient of contraction of at least 1 to 10 percent relatively to said plastic material, said fiber element means having a plurality of portions permanently maintained in stressed condition in intimate contact with said body, providing an article reinforced with a substantial proportion of stressed fibers.

4. A reinforced article as claimed in claim 3 wherein said fibers are glass.

5. A grinding wheel having a central axis of rotation, said wheel being formed of abrasive grains bonded together with an organic plastic material and having integrally bonded reinforcing means imbedded in said wheel, said reinforcing means comprising strand means composed of a multiplicity of glass fibers impregnated with an adherent coating compatible with the organic plastic material of said wheel and having a high coefficient of contraction relatively to that of said organic plastic material, and being positioned around the central axis of rotation of the wheel, the glass fibers of said reinforcing means having a plurality of portions permanently maintained in stressed condition within said wheel, providing a grinding wheel reinforced with a substantial proportion of stressed glass fibers.

6. A grinding wheel as claimed in claim 5 wherein said strand means generally annularly positioned around said axis maintaining said wheel in compressed condition.

7. A grinding wheel as claimed in claim 5 wherein said strand means are formed into an open mesh fabric generally perpendicularly positioned with respect to said axis.

8. In combination with a grinding wheel, a reinforcement surrounding at least a portion of said wheel comprising a rigid bonded fiber element consisting of a multiplicity of annularly extending fibers stiffened and bonded together with a bonding agent, said element having a latent high coefficient of contraction of at least 1 to 10 percent upon heating relatively to the coefficient of contraction of said wheel.

9. A reinforcement as claimed in claim 8 wherein said fibers are glass and coated with a partially cured bonding agent having a high coefficient of contraction of at least 1 to 10 percent.

10. A reinforcement as claimed in claim 8 wherein said reinforcement is in the form of a closed figure of revolution having a central axis and extending therealong for a substantial axial distance.

11. A reinforcement as claimed in claim 10 wherein said figure of revolution is generally cylindrical.

12. A reinforcement as claimed in claim 9 wherein said fibers have a latent high coefficient of contraction of at least 1 to 10 percent upon heating and are coated with a partially cured bonding agent.

13. A reinforced ginding wheel with a central axis and having a body composed at least in part of relatively non-yielding cured plastic material with a textile fiber reinforcing element having a latent high coefficient of contraction at least 1 to 10 percent relatively to the coefficient of contraction of said body, said reinforcing element bein positioned around the central axis of said wheel surrounding at least a portion of said body and being contracted to stress the fibers of said element in intimate contact with said body.

14. A grinding wheel having a central axis of rotation, said wheel being formed of abrasive grains bonded together to form a relatively non-yielding cured body having integrally bonded reinforcing means, said reinforcing means comprising strand means composed of a multiplicity of fibers having a latent high coefficient of contraction of at least 1 to 10 percent relatively to the coefficient of contraction of said body and being positioned around the central axis of rotation of the wheel surrounding at least a portion of said body, the fibers of said reinforcing means having a plurality of portions permanently maintained in stressed condition, providing a grinding wheel reinforced with a substantial proportion of stressed fibers.

15. A grinding wheel having a central axis of rotation, said wheel being formed of abrasive grains bonded together to form a relatively non-yielding body having integrally bonded curved reinforcing means in the form of a closed figure of revolution extending along the central axis of said wheel at least partially imbedded in said wheel, said reinforcing means comprising strand means composed of a multiplicity of fibers having a latent high coefficient of contraction of at least 1 to 10 percent relatively to the coefficient of contraction of said body and being positioned generally annularly around the central axis of rotation of the wheel surrounding at least a portion of said body and maintaining said body therewithin in compressed condition, the fibers of said curved reinforcing means being permanently maintained in stressed condition, providing a grinding wheel reinforced with a substantial proportion of stressed fibers.

16. A reinforcement as claimed in claim 8 wherein said fibers are organic plastic fibers having a latent high coefficient of contraction of at least 1 to 10 percent upon heating relatively to the coefficient of contraction of said wheel.

17. A reinforced grinding wheel as claimed in claim 13 wherein the fibers of said element are organic plastic fibers having a latent high coefficient of contraction of at least 1 to 10 percent upon heating relatively to the coefficient of contraction of said body.

References Cited

UNITED STATES PATENTS

| | | | |
|---|---|---|---|
| 642,828 | 2/1900 | Spohn | 51—206 |
| 2,475,517 | 7/1949 | Ries | 51—206 |
| 2,800,754 | 7/1957 | Robertson | 51—209 |
| 2,826,016 | 3/1958 | Hurst | 51—206 |
| 2,859,936 | 11/1958 | Warnken | 18—36 X |
| 3,141,271 | 7/1964 | Fischer | 51—206 |
| 3,262,230 | 7/1966 | Seymour | 51—206 |
| 2,425,883 | 8/1947 | Jackson | 52—723 |
| 2,474,375 | 6/1949 | Shearer. | |
| 2,539,301 | 1/1951 | Foster. | |
| 2,652,093 | 9/1953 | Burton | 156—86 |
| 3,234,619 | 2/1966 | Vitz | 25—118 |

ROBERT C. RIORDON, *Primary Examiner.*

D. G. KELLY, *Assistant Examiner.*

U.S. Cl. X.R.

52—223; 156—160; 161—92, 96

UNITED STATES PATENT AND TRADEMARK OFFICE
CERTIFICATE OF CORRECTION

PATENT NO. : 3,431,687
DATED : March 11, 1969
INVENTOR(S) : Herbert C. Fischer and Herbert C. Fischer, Jr.

It is certified that error appears in the above-identified patent and that said Letters Patent are hereby corrected as shown below:

Claim 3, column 5, line 68, delete "plastic material" and add --body--.

Signed and Sealed this

Twentieth Day of July 1976

[SEAL]

Attest:

RUTH C. MASON
*Attesting Officer*

C. MARSHALL DANN
*Commissioner of Patents and Trademarks*